United States Patent [19]
Kuo

[11] Patent Number: 5,937,678
[45] Date of Patent: Aug. 17, 1999

[54] LOCK ASSEMBLY WITH FLEXIBLE CABLE

[76] Inventor: Lambert Kuo, No. 16, Lane 459, Sec. 1, An Ho Rd., Tainan, Taiwan

[21] Appl. No.: 09/191,578

[22] Filed: Nov. 13, 1998

[51] Int. Cl.$^6$ ..................................................... E05B 73/00
[52] U.S. Cl. ........................ 70/18; 70/49; 70/58; 70/233
[58] Field of Search .................................... 70/18, 30, 49, 70/52, 34, 58, 54–56, 233, 417, DIG. 56

[56] References Cited

U.S. PATENT DOCUMENTS

| | | | |
|---|---|---|---|
| 2,623,378 | 12/1952 | Haver | 70/49 |
| 3,830,085 | 8/1974 | Gerlach | 70/18 X |
| 4,155,231 | 5/1979 | Zane et al. | 70/18 |
| 4,674,306 | 6/1987 | Halpern | 70/18 X |
| 4,719,773 | 1/1988 | Alberts | 70/18 |
| 4,819,464 | 4/1989 | Kuo | 70/18 |
| 4,920,772 | 5/1990 | Denison | 70/56 X |
| 4,949,564 | 8/1990 | Barzilai | 70/39 X |
| 5,568,740 | 10/1996 | Lin | 70/18 X |
| 5,706,679 | 1/1998 | Zane et al. | 70/18 |

Primary Examiner—Lloyd A. Gall
Attorney, Agent, or Firm—Alan Kamrath; Oppenheimer Wolff & Donnelly LLP

[57] ABSTRACT

A lock assembly includes a lock body having a first end portion with a lock member mounted therein, a mediate portion containing a lock hole therein, and a second end portion containing a receiving channel having a closed side and an open side, a cable detachably extending through the receiving channel and having a first end portion formed with an eye, and a second end portion formed with a snapper slidably inserted into the lock hole and detachably locked by the lock member, and a tubular retaining sleeve slidably mounted on the lock body to restrain the cable and containing two radially opposite openings defined in the bottom thereof each for receiving the elongated cable therein.

11 Claims, 10 Drawing Sheets

LOCK ASSEMBLY WITH FLEXIBLE CABLE

CROSS-REFERENCES TO RELATED APPLICATIONS

Not Applicable.

BACKGROUND OF THE INVENTION

1. Field of the Invention

The present invention relates to a lock assembly, and more particularly to a lock assembly with a flexible cable.

2. Description of the Related Art

The closest prior arts of which the applicant is aware are disclosed in the following documents:

(1) U.S. Pat. No. 5,706,679 to Zane et al., filed on Jun. 26, 1995;

(2) U.S. Pat. No. 5,447,043 to Hwang, filed on Sep. 5, 1995;

(3) U.S. Pat. No. 5,291,765 to Hoisington, filed on Mar. 8, 1994;

(4) U.S. Pat. No. 5,265,451 to Phifer, filed on Nov. 30, 1993;

(5) U.S. Pat. No. 4,850,207 to Ylven, filed on Jul. 25, 1989;

(6) U.S. Pat. No. 4,819,464 to Kuo, filed on Apr. 11, 1989; and (7) U.S. Pat. No. 4,028,916 to Pender, filed on Mar. 26, 1977.

BRIEF SUMMARY OF THE INVENTION

In accordance with one aspect of the present invention, there is provided a lock assembly comprising a lock body having a first end portion, a mediate portion containing a lock hole transversely defined therein, and a second end portion containing a lateral receiving channel having a closed side and an open side, the lock body further including a lock member mounted in the first end portion thereof and connecting to the lock hole, an elongate cable slidably and detachably extending through the receiving channel, and having a first end portion formed with a eye, and a second end portion formed with a snapper slidably inserted into the lock hole and detachably locked by the lock member, and a tubular retaining sleeve slidably mounted on the lock body for retaining the elongated cable and containing two radially opposite openings defined in the bottom thereof each receiving the elongated cable therein.

In accordance with another aspect of the present invention, there is provided a lock assembly comprising a lock body having a first end portion, a mediate portion containing a lock hole transversely defined therein, and a second end portion containing a lateral receiving channel having a closed side and an open side, the lock body further including a lock member mounted on the first end portion thereof and connecting to the lock hole, a snapper having a first end portion slidably inserted into the lock hole and detachably locked by the lock member, and a second end portion formed with an annular enlarged limiting shoulder, and a tubular retaining sleeve slidably mounted on the lock body and containing two radially opposite openings defined in the bottom thereof each aligning with the receiving channel.

Further benefits and advantages of the present invention will become apparent after a careful reading of the detailed description with appropriate reference to the accompanying drawings.

DETAILED DESCRIPTION OF THE INVENTION

Figure 1:
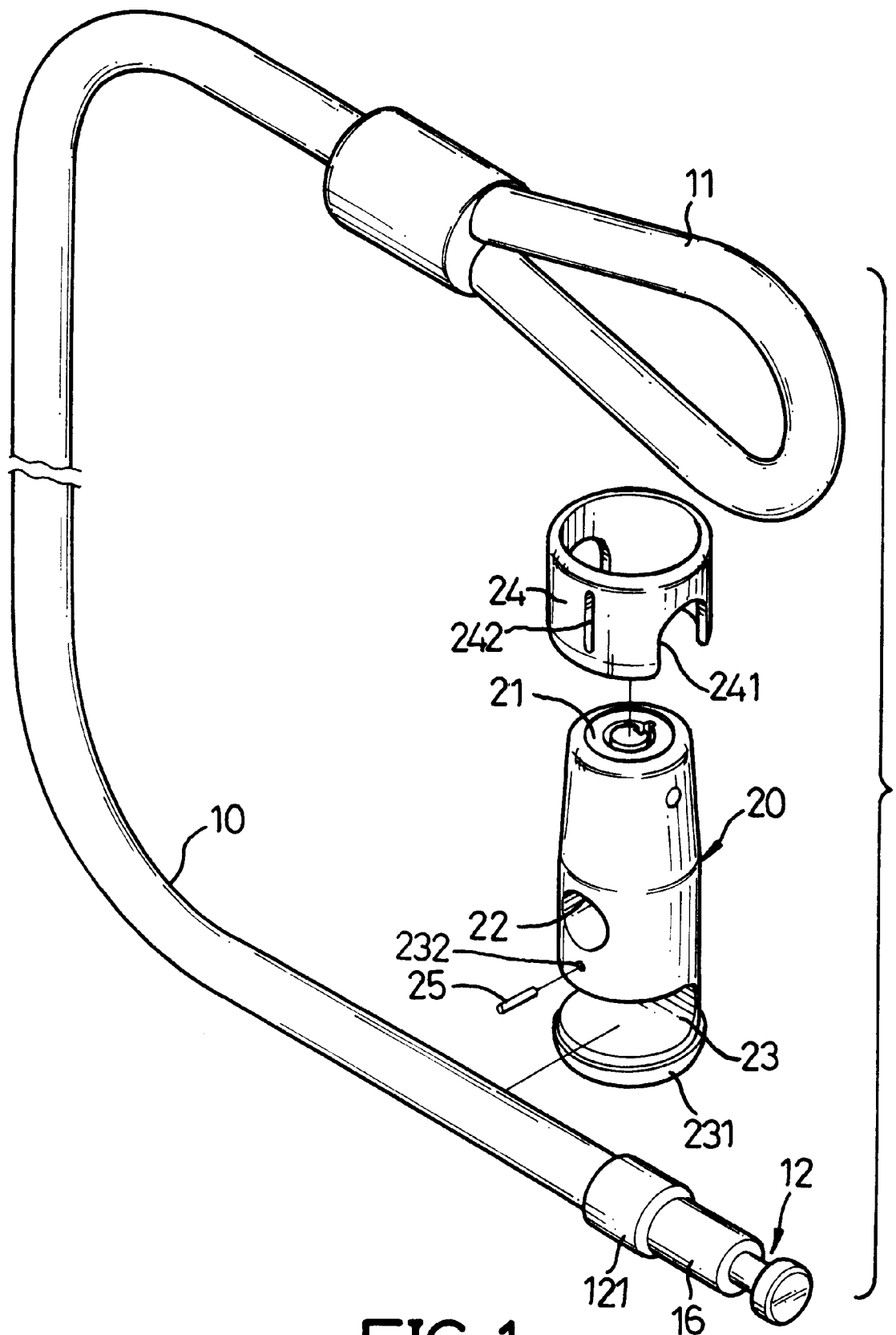
FIGS. 1 and 2 are perspective exploded views of a flexible lock assembly in accordance with the present invention.
Figure 2:
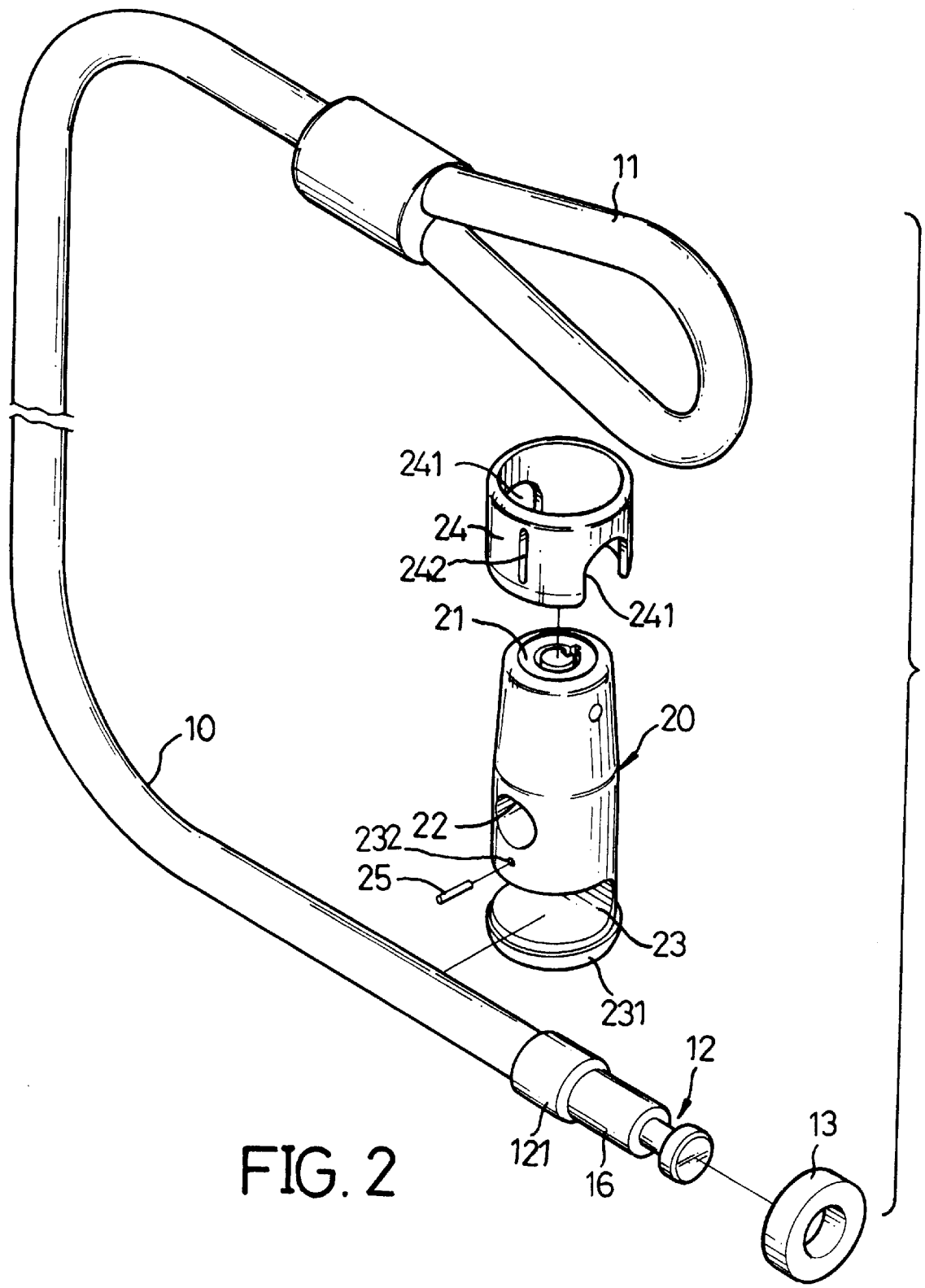
Figure 3:
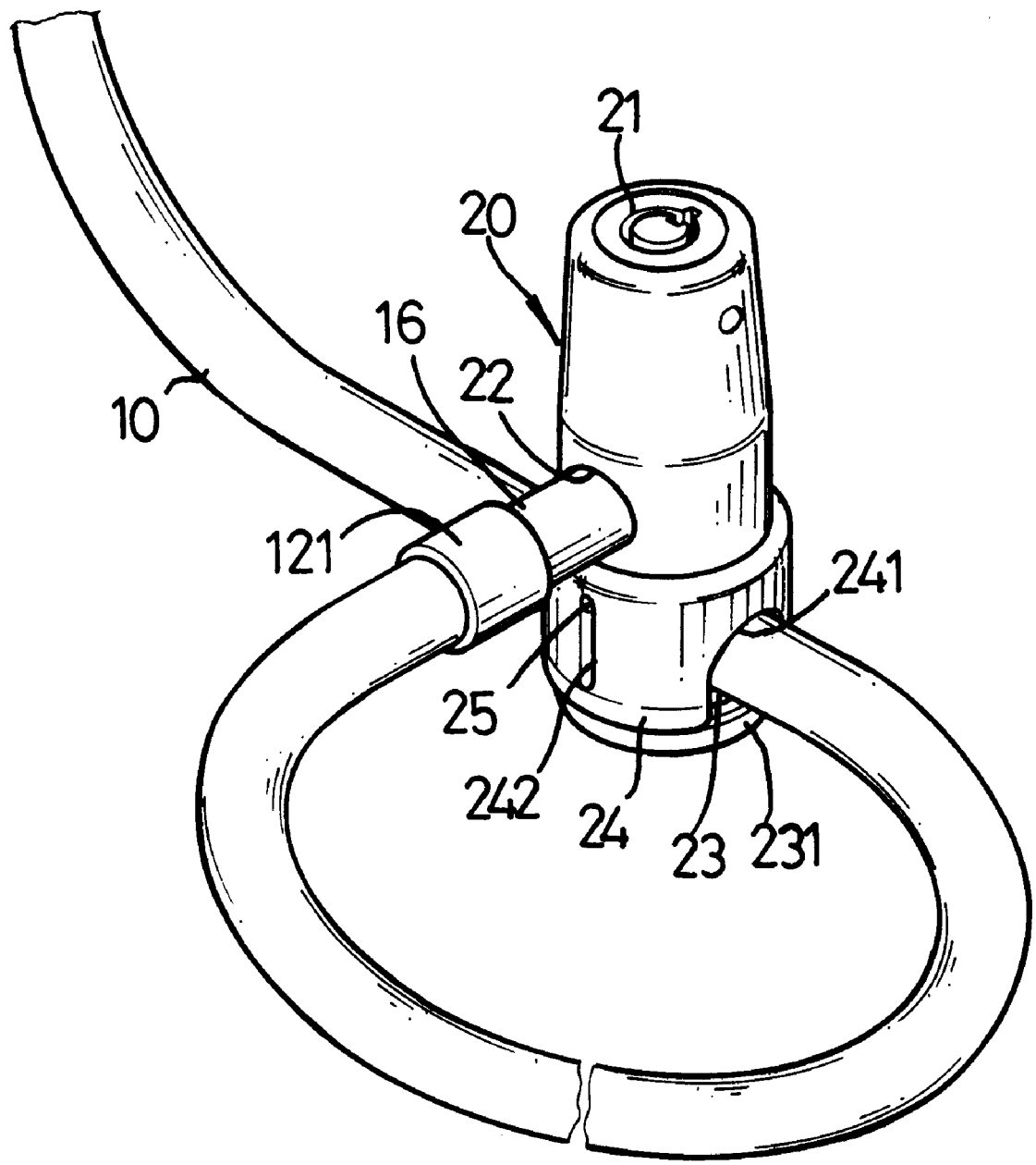
FIG. 3 is a perspective assembly view of the lock assembly as shown in FIG. 1.

Referring now to the drawings and initially to FIGS. 1–3, a lock assembly in accordance with the present invention comprises a lock body (20) having a first end portion, a mediate portion containing a lock hole (22) transversely defined therein, and a second end portion containing a lateral receiving channel (23) having a closed side and an open side, the lock body (20) including a lock member (21) mounted in the first end portion thereof and connecting to the lock hole (22), an elongate cable (10) slidably and detachably extending through the receiving channel (23) and having a first end portion formed with a eye (11), and a second end portion (16) formed with a snapper (12) slidably inserted into the lock hole (22) and detachably locked by the lock member (21), and a tubular retaining sleeve (24) slidably mounted on the lock body (20) to retain the elongated cable (10) and containing two radially opposite openings (241) defined in the bottom thereof each receiving the elongated cable (10) therein.

The lock body (20) contains a positioning bore (232) defined in the second end portion thereof and located between the lock hole (22) and the receiving channel (23), the retaining sleeve (24) contains an elongated guide slot (242) longitudinally defined therein and aligning with the positioning bore (232), and the lock body (20) further includes a retaining pin (25) having a first end portion secured in the positioning bore (232), and a second end portion slidably received in the guide slot (242).

The lock body (20) includes an annular limiting flange (231) radially extending outward from the second end portion thereof and located under the receiving channel (23). The retaining sleeve (24) has a length smaller than the distance between the lock hole (22) and the limiting flange (231).

The elongated cable (10) includes an annular limiting shoulder (121) formed on the second end portion (16)

thereof and located adjacent to the snapper (12). The lock assembly further comprises a washer (13) detachably mounted on the second end portion (16) of the elongated cable (10) and abutting the limiting shoulder (121).

Figure 4:
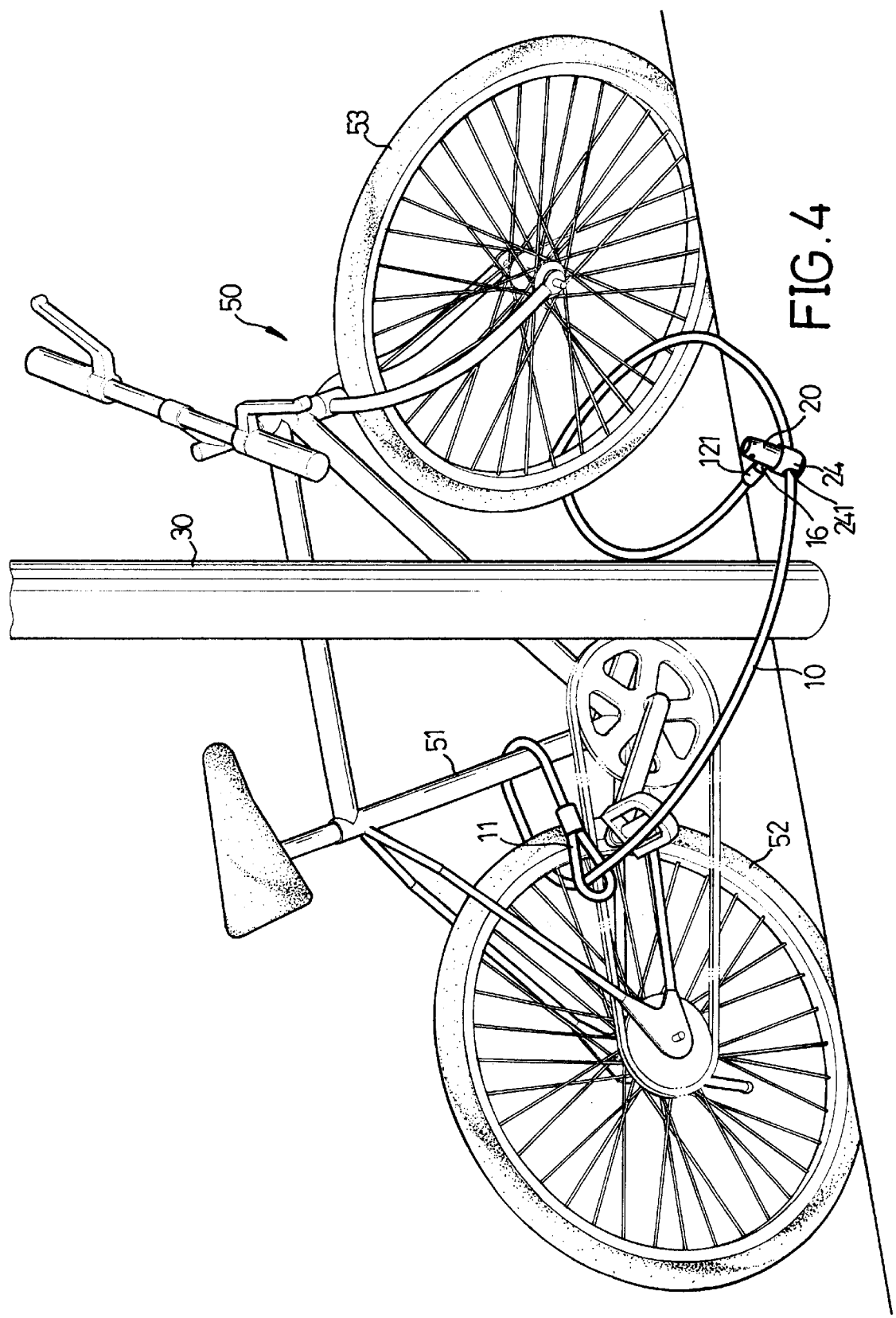
FIG. 4 is an operational view of the lock assembly as shown in FIG. 1 in accordance with a first embodiment of the present invention.

In practice, referring to FIG. 4 with reference to FIGS. 1–3, in accordance with a first embodiment of the present invention, the second end portion (16) of the cable (10) is extended in turn through the frame (51) and the rear wheel (52) of a bicycle (50), then through the eye (11) thereof, then around an upright pole (30), and then through the front wheel (53) of the bicycle (50). The retaining sleeve (24) is then moved upward relative to lock body (20) such that the lock body (20) can be attached to the cable (10) with the receiving channel (23) receiving the cable (10) therein. The retaining sleeve (24) is then moved downward relative to the lock body (20) with each of the two openings (241) receiving the cable (10) therein, thereby restraining the cable (10) in the retaining sleeve (24). The snapper (12) of the second end portion (16) of the cable (10) is then inserted into the lock hole (22) to be locked by the lock member (21), thereby securing the bicycle (50) to the upright pole (30).

Figure 5:
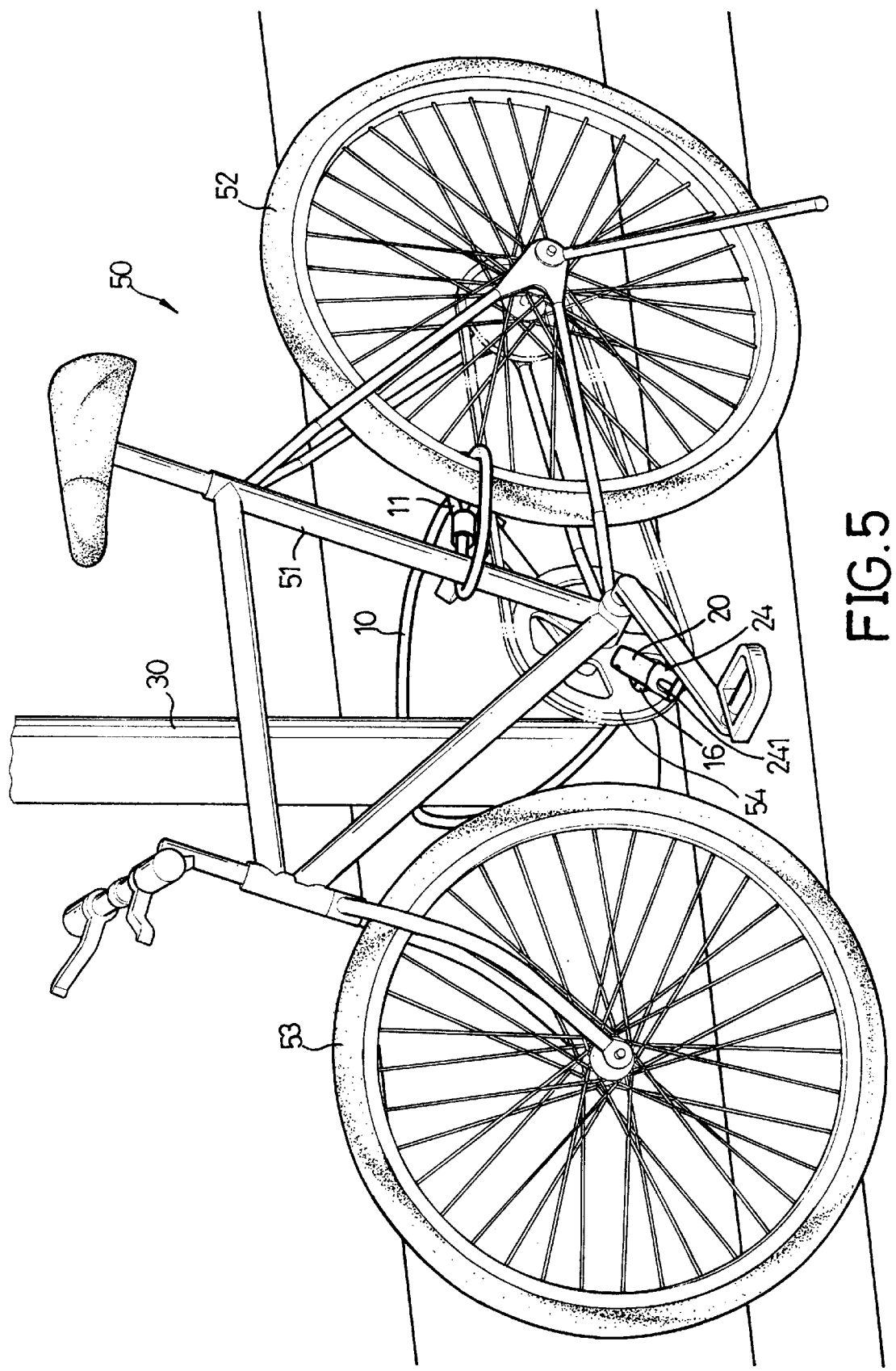
FIG. 5 is an operational view of the lock assembly as shown in FIG. 1 in accordance with a second embodiment of the present invention.

Referring now to FIG. 5 with reference to FIGS. 1–3, in accordance with a second embodiment of the present invention, the second end portion (16) of the cable (10) is extended in turn through the frame (51) and the rear wheel (52) of the bicycle (50), then through the eye (11) thereof, then around the upright pole (30), and then through the pedal sprocket (54) of the bicycle (50). The lock body (20) is then moved to abut the surface of the pedal sprocket (54) such that the snapper (12) of the second end portion (16) of the cable (10) can be inserted into the lock hole (22) to be locked by the lock member (21), thereby securing the bicycle (50) to the upright pole (30).

Figure 6:
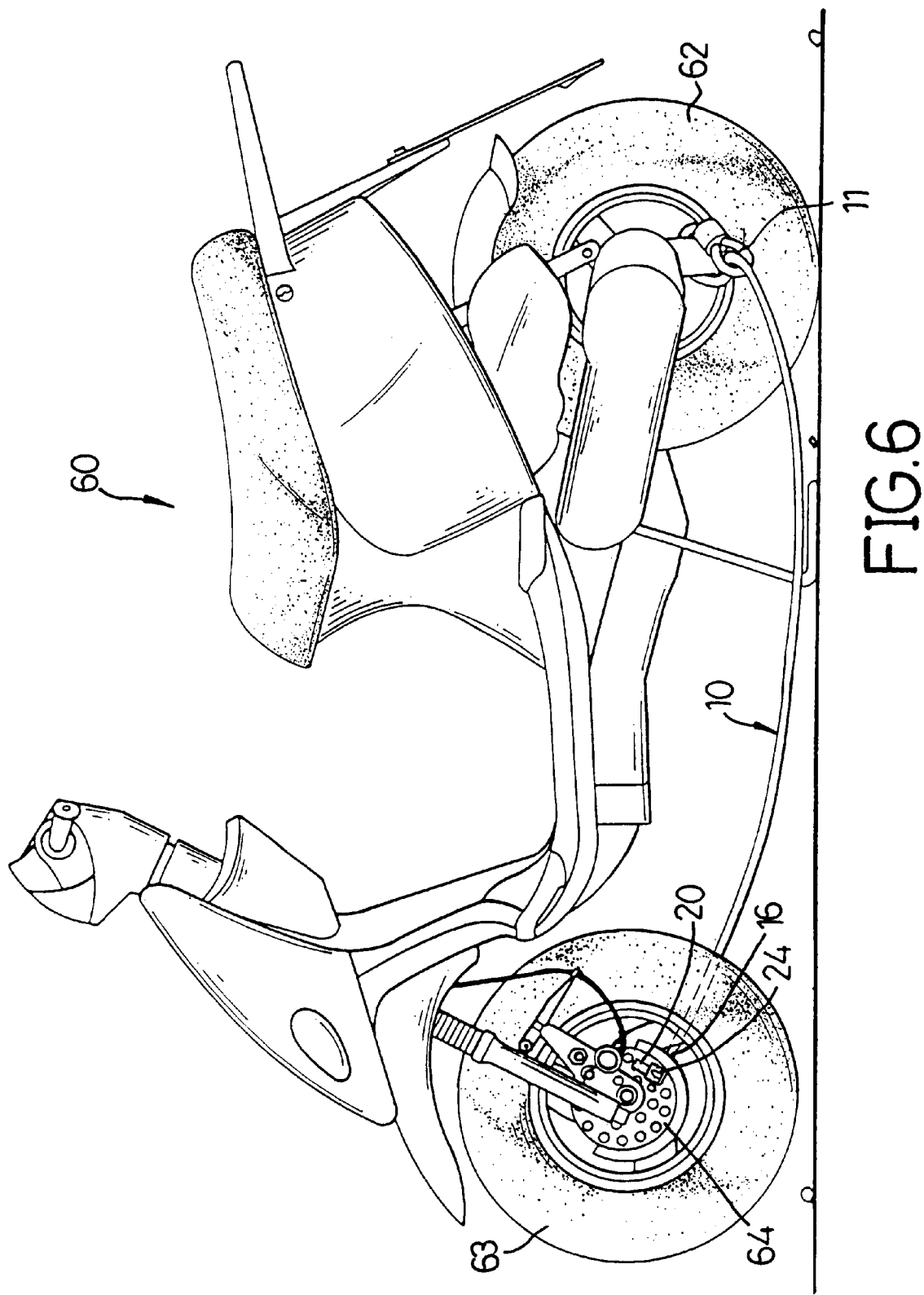
FIG. 6 is an operational view of the lock assembly as shown in FIG. 1 in accordance with a third embodiment of the present invention.

Referring now to FIG. 6 with reference to FIGS. 1–3, in accordance with a third embodiment of the present invention, the second end portion (16) of the cable (10) is initially extended through the rear wheel (62) of a motorcycle (60), then through the eye (11) of the cable (10), then through the front wheel (63) of the motorcycle (60), and then through the brake disc (64) of the front wheel (63). The lock body (20) is then moved to abut one side surface of the brake disc (64) such that the snapper (12) of the second end portion (16) of the cable (10) can be inserted into the lock hole (22) to be locked by the lock member (21), thereby securing the motorcycle (60).

Figure 7:
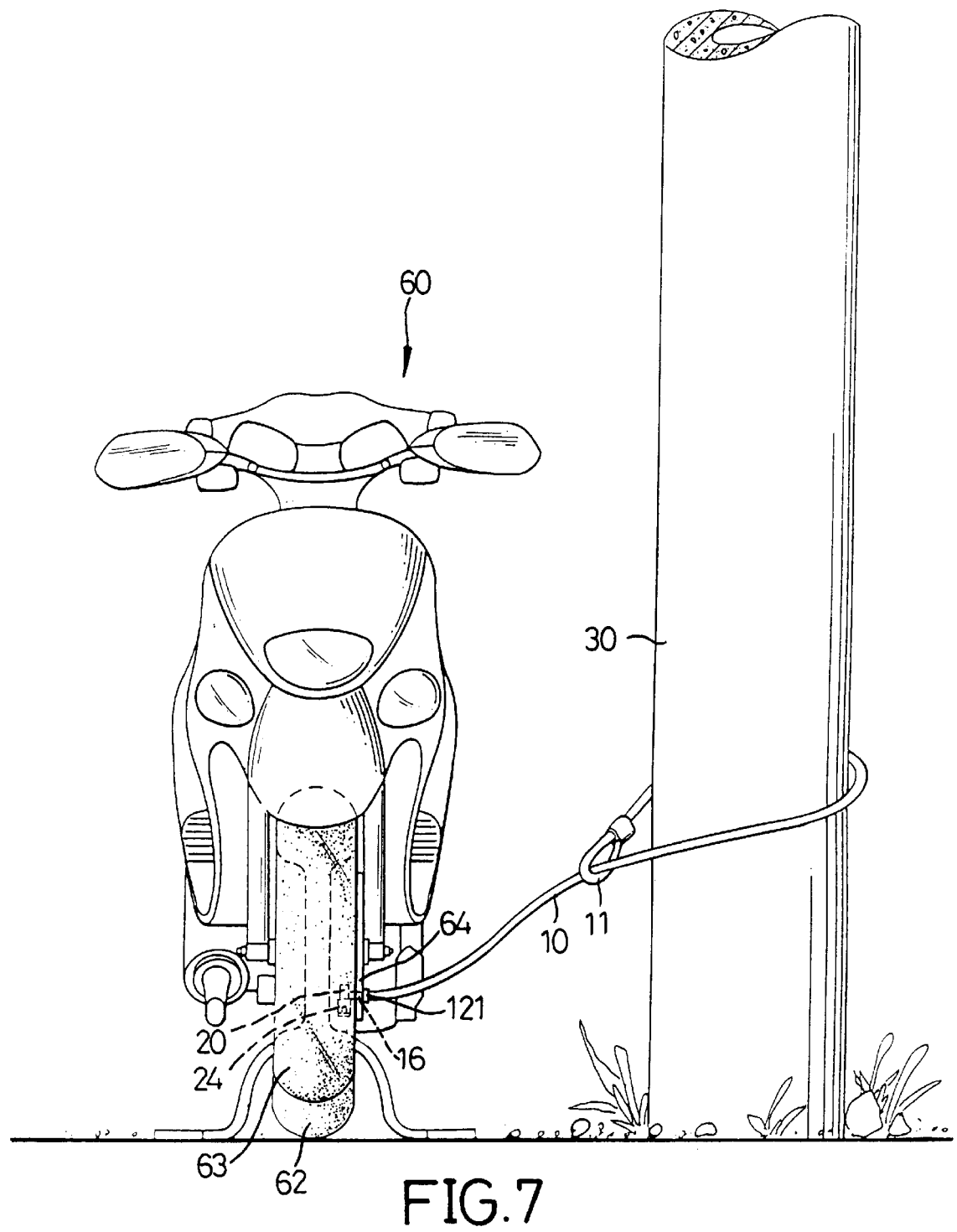
FIG. 7 is an operational view of the lock assembly as shown in FIG. 1 in accordance with a fourth embodiment of the present invention.

Referring now to FIG. 7 with reference to FIGS. 1–3, in accordance with a fourth embodiment of the present invention, the second end portion (16) of the cable (10) is initially extended around the upright pole (30), then through the eye (11) of the cable (10), and then through the brake disc (64) of the front wheel (63). The lock body (20) is then moved to abut the other side surface of the brake disc (64) such that the snapper (12) of the second end portion (16) of the cable (10) can be inserted into the lock hole (22) to be locked by the lock member (21), thereby securing the motorcycle (60) to the upright pole (30).

Figure 8:
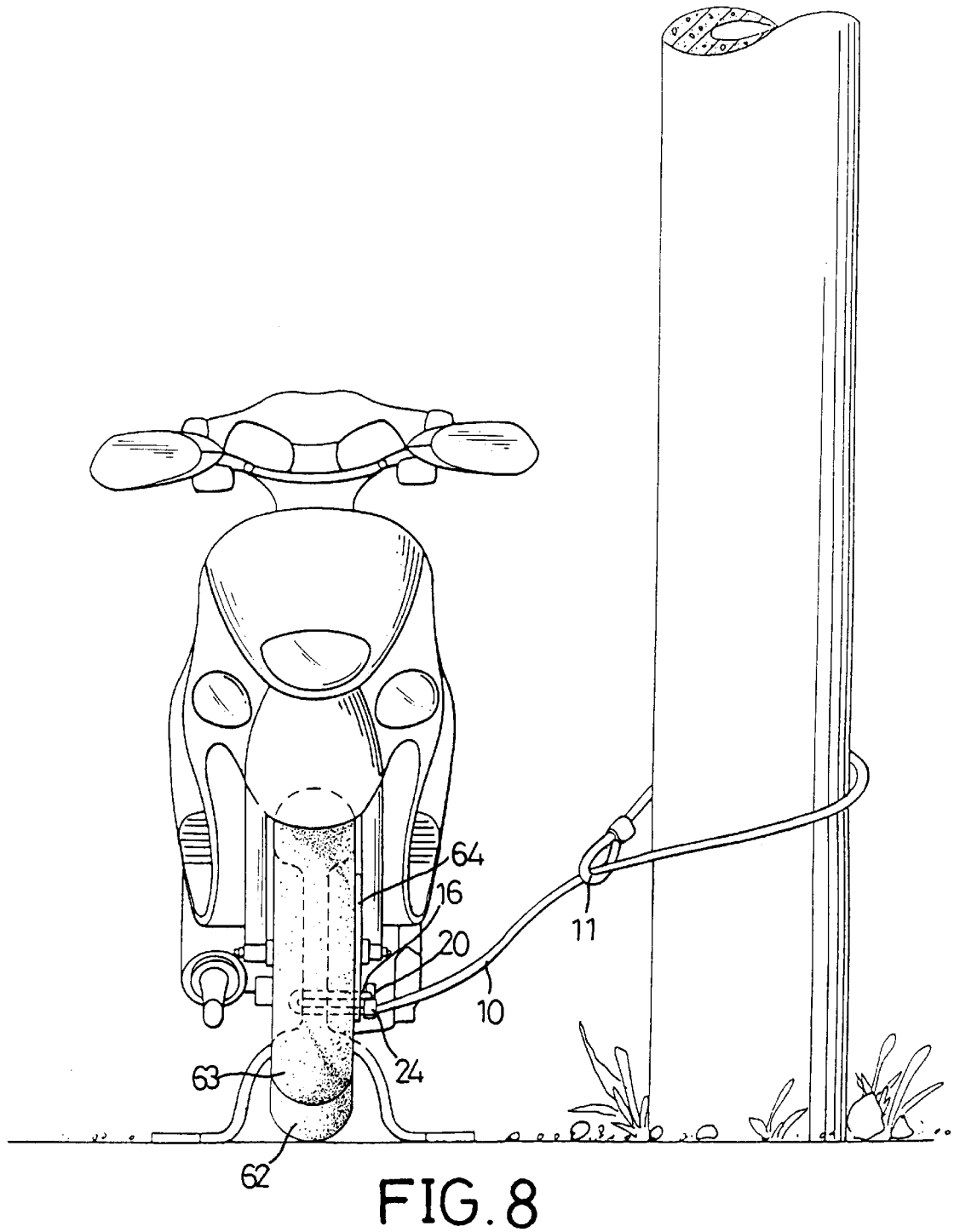
FIG. 8 is an operational view of the lock assembly as shown in FIG. 1 in accordance with a fifth embodiment of the present invention.

Referring now to FIG. 8 with reference to FIGS. 1–3, in accordance with a fifth embodiment of the present invention, the second end portion (16) of the cable (10) is initially extended around the upright pole (30), then through the eye (11) of the cable (10), then through the brake disc (64) of the front wheel (63), and then through the front wheel (63) of the motorcycle (60) so as to extend outward therefrom. The retaining sleeve (24) is then moved upward relative to lock body (20) such that the lock body (20) can be attached to the cable (10) with the receiving channel (23) receiving the cable (10) therein. The retaining sleeve (24) is then moved downward relative to the lock body (20) with each of the two openings (241) receiving the cable (10) therein, thereby restraining the cable (10) in the retaining sleeve (24). The snapper (12) of the second end portion (16) of the cable (10) can then be inserted into the lock hole (22) to be locked by the lock member (21), thereby securing the motorcycle (60) to the upright pole (30).

Figure 9:
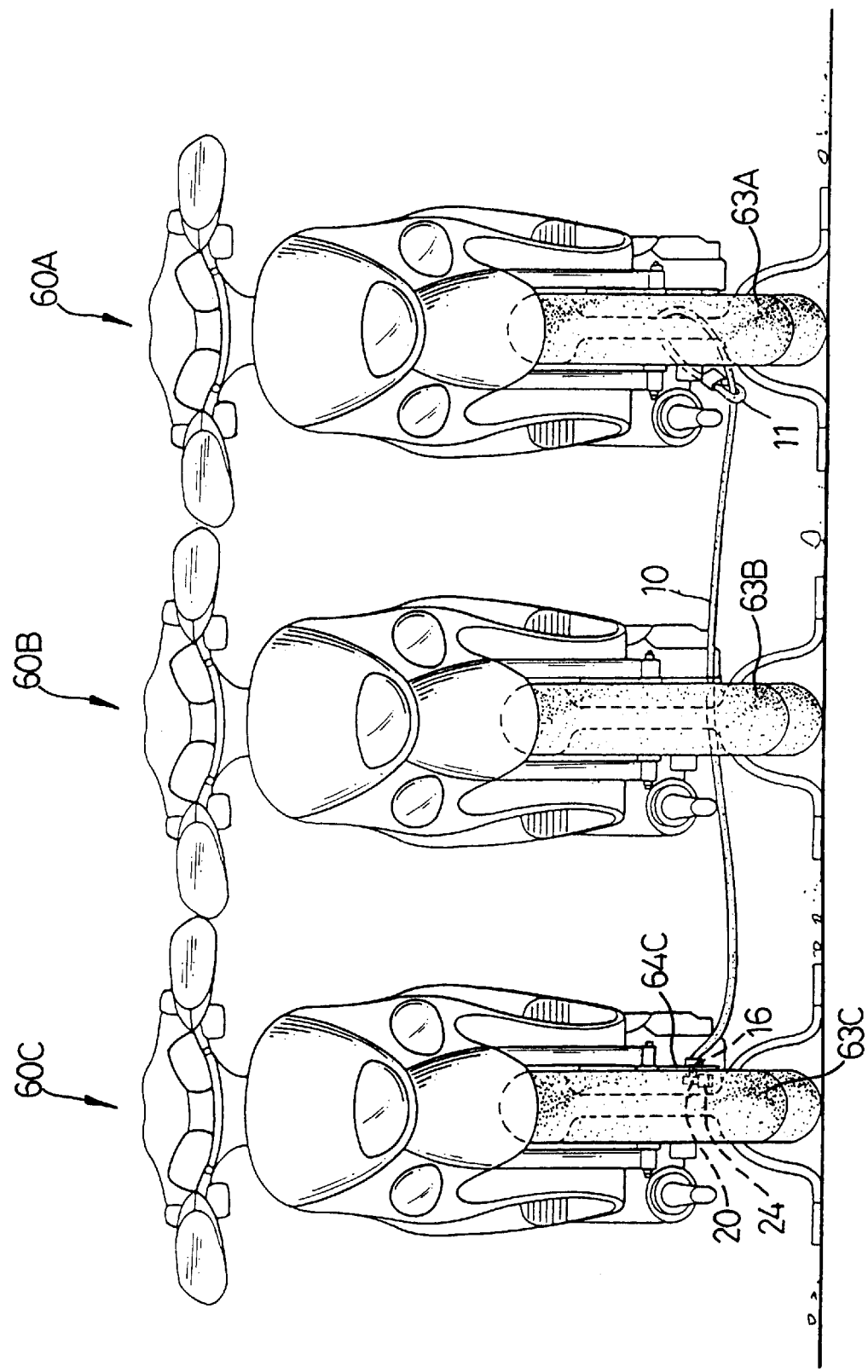
FIG. 9 is an operational view of the lock assembly as shown in FIG. 1 in accordance with a sixth embodiment of the present invention.

Referring now to FIG. 9 with reference to FIGS. 1–3, in accordance with a sixth embodiment of the present invention, the second end portion (16) of the cable (10) is extended in turn through the front wheel (63A) of the first motorcycle (60A), then through the eye (11) of the cable (10), then through the front wheel (63B) of a second motorcycle (60B), and then through the brake disc (64C) of the front wheel (63C) of a third motorcycle (60C). The lock body (20) is then moved to abut the other side surface of the brake disc (64C) such that the snapper (12) of the second end portion (16) of the cable (10) can be inserted into the lock hole (22) to be locked by the lock member (21), thereby securing the motorcycles (60A, 60B and 60C) together.

Figure 10:
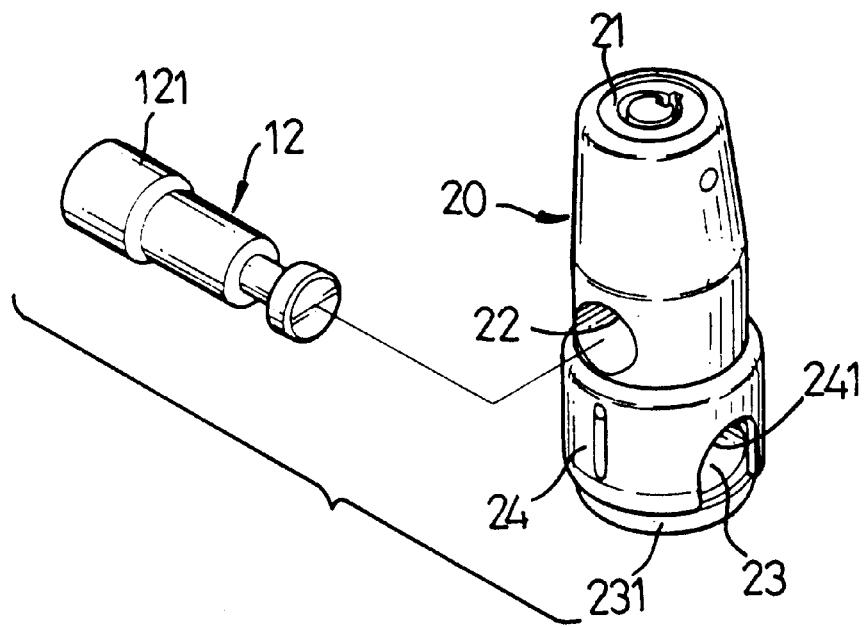
FIGS. 10 and 11 are perspective exploded views of a lock assembly in accordance with a further embodiment of the present invention.
Figure 11:
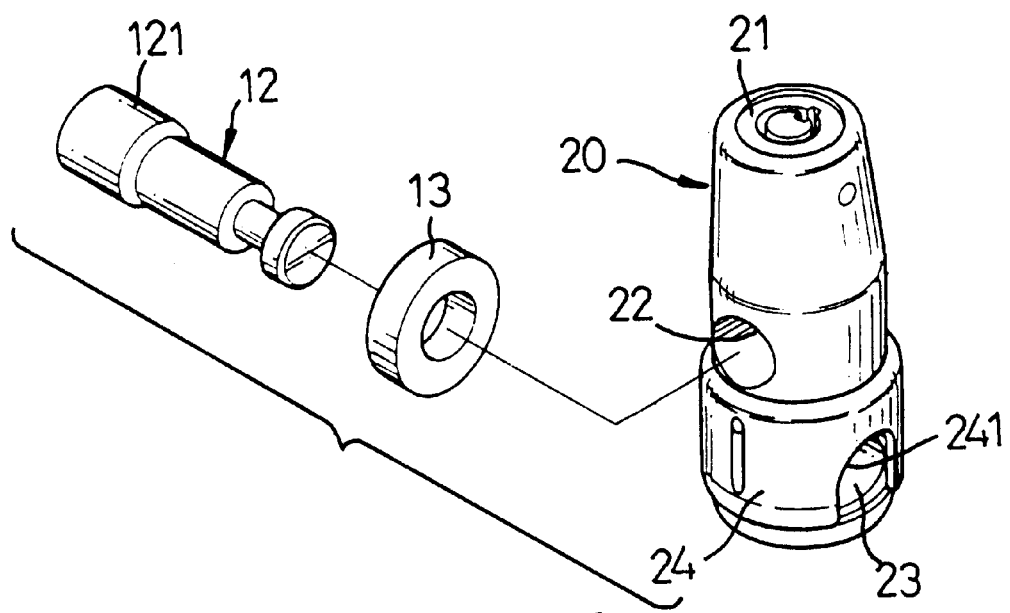

Referring to FIGS. 10 and 11 with reference to FIGS. 1–3, in accordance with a further embodiment of the present invention, the cable (10) is not included in the lock assembly such that only the snapper (12) is used in conjunction with the lock body (20). The snapper (12) includes a first end portion slidably inserted into the lock hole (22) and detachably locked by the lock member (21) of the lock body (20), and a second end portion formed with an annular enlarged limiting shoulder (121). A washer (13) is detachably mounted on the snapper (12) and abutting the limiting shoulder (121).

It should be clear to those skilled in the art that further embodiments may be made without departing from the scope and spirit of the present invention.

What is claimed is:

1. A lock assembly comprising:
   a lock body (20) having a first end portion, a mediate portion containing a lock hole (22) transversely defined therein, and a second end portion containing a lateral receiving channel (23) having a closed side and an open side, and said lock body (20) further including a lock member (21) mounted in the first end portion thereof and connecting to said lock hole (22);
   an elongated cable (10) slidably and detachably extending through said receiving channel (23), and having a first end portion formed with a eye (11), and a second end portion (16) formed with a snapper (12) to be slidably inserted into said lock hole (22) and detachably locked by said lock member (21); and
   a tubular retaining sleeve (24) slidably mounted on said lock body (20) for retaining said elongated cable (10) and containing two radially opposite openings (241) defined in the bottom thereof to align with the ends of the channel (23) and accommodate said elongated cable (10) therein.

2. The lock assembly in accordance with claim 1, wherein said lock body (20) contains a positioning bore (232) defined in the second end portion thereof and located between said lock hole (22) and said receiving channel (23), said retaining sleeve (24) contains an elongated guide slot (242) longitudinally defined therein and aligning with said positioning bore (232), and said lock body (20) further includes a retaining pin (25) having a first end portion secured in said positioning bore (232), and a second end portion slidably received in said guide slot (242).

3. The lock assembly in accordance with claim 1, wherein said lock body (20) includes an annular limiting flange (231) radially extending outward from the second end portion thereof and located under said receiving channel (23).

4. The lock assembly in accordance with claim 3, wherein said retaining sleeve (24) has a length smaller than the distance between said lock hole (22) and said limiting flange (231).

5. The lock assembly in accordance with claim 1, wherein said elongated cable (10) includes an annular limiting shoulder (121) formed on the second end portion (16) thereof and located adjacent to said snapper (12).

6. The lock assembly in accordance with claim 5, further comprising a washer (13) detachably mounted on said second end portion (16) of said elongated cable (10) and abutting said limiting shoulder (121).

7. A lock assembly comprising:

a lock body (20) having a first end portion, a mediate portion containing a lock hole (22) transversely defined therein, and a second end portion containing a lateral receiving channel (23) having a closed side and an open side, said lock body (20) further including a lock member (21) mounted in the first end portion thereof and connecting to said lock hole (22);

a snapper (12) having a first end portion slidably inserted into said lock hole (22) and detachably locked by said lock member (21), and a second end portion (16) formed with an annular enlarged limiting shoulder (121); and a tubular retaining sleeve (24) slidably mounted on said lock body (20) and containing two radially opposite openings (241) defined in the bottom thereof each aligning with said receiving channel (23).

8. The lock assembly in accordance with claim 7, wherein said lock body (20) contains a positioning bore (232) defined in the second end portion thereof and located between said lock hole (22) and said receiving channel (23), said retaining sleeve (24) contains an elongated guide slot (242) longitudinally defined therein and aligning with said positioning bore (232), and said lock body (20) further includes a retaining pin (25) having a first end portion secured in said positioning bore (232), and a second end portion slidably received in said guide slot (242).

9. The lock assembly in accordance with claim 7, wherein said lock body (20) includes an annular limiting flange (231) radially extending outward from the second end portion thereof and located under said receiving channel (23).

10. The lock assembly in accordance with claim 9, wherein said retaining sleeve (24) has a length smaller than the distance between said lock hole (22) and said limiting flange (231).

11. The lock assembly in accordance with claim 7, further comprising a washer (13) detachably mounted on said snapper (12) and abutting said limiting shoulder (121).

* * * * *